United States Patent [19]
Brown, deceased et al.

[11] 3,914,259

[45] Oct. 21, 1975

[54] DITHIO-SUBSTITUTED CARBAMATES

[75] Inventors: Melancthon S. Brown, deceased, late of Berkeley, Calif., by Gustave K. Kohn, administrator, Berkeley, Calif.

[73] Assignee: Chevron Research Company, San Francisco, Calif.

[22] Filed: July 11, 1974

[21] Appl. No.: 483,582

Related U.S. Application Data

[63] Continuation-in-part of Ser. No. 250,908, May 8, 1972, Pat. No. 3,843,689, which is a continuation-in-part of Ser. Nos. 88,105, Nov. 9, 1970, Pat. No. 3,679,733, and Ser. No. 189,732, Oct. 15, 1971, abandoned.

[52] U.S. Cl. ...... 260/346.2 R; 260/470; 260/479 C; 260/481 C; 424/285; 424/300
[51] Int. Cl. ............................................. C07d 5/36
[58] Field of Search ......... 260/346.2 R, 470, 479 C, 260/481 C

[56] References Cited
UNITED STATES PATENTS
3,822,295    7/1974    Serban et al. ............... 260/346.2 R

*Primary Examiner*—Henry R. Jiles
*Assistant Examiner*—Bernard I. Dentz
*Attorney, Agent, or Firm*—J. A. Buchanan, Jr.; John Stoner, Jr.; Raymond Owyang

[57] ABSTRACT

Novel dithio-substituted carbamates having insecticidal activity are prepared by the reaction of an N-chlorothio carbamate and an alkyl or aryl mercaptan. The N-chlorothio carbamate reactant is produced by the reaction of sulfur dichloride and a carbamate having at least one hydrogen substituted on the carbamate nitrogen atom in the presence of a rate-determining amount of an acid acceptor.

10 Claims, No Drawings

DITHIO-SUBSTITUTED CARBAMATES

CROSS-REFERENCE TO RELATED APPLICATIONS

This application is a continuation-in-part of U.S. Ser. No. 250,908, filed May 8, 1972, now U.S. Pat. No. 3,843,689, which in turn is a continuation-in-part of U.S. Ser. No. 88,105, filed Nov. 9, 1970, now U.S. Pat. No. 3,679,733, and U.S. Ser. No. 189,732, filed Oct. 15, 1971, now abandoned, the disclosures of all of which applications are incorporated herein be reference.

DESCRIPTION OF THE INVENTION

The dithio-substituted carbamates are represented by formula (I):

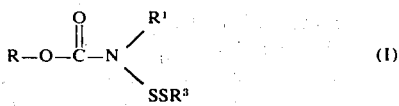

wherein R is a monovalent organo group of 1 to 20 carbon atoms, preferably 1 to 10 carbon atoms, $R^1$ is hydrogen or alkyl of 1 to 10 carbon atoms, and $R^3$ is alkyl of 1 to 10 carbon atoms, haloalkyl of 1 to 2 carbon atoms and 1 to 5 chloro or bromo, or phenyl substituted with up to 2 (0 to 2) fluoro, chloro, bromo or alkyl of 1 to 4 carbon atoms.

The organo R is preferably free from nonaromatic unsaturation, e.g., from olefinic and acetylenic unsaturation. The R group is therefore suitably saturated aliphatic, i.e., acyclic saturated aliphatic as well as saturated cycloaliphatic, or is aromatic, preferably mononuclear or binuclear aromatic, and is a hydrocarbyl group containing only atoms of carbon and hydrogen or is a substituted hydrocarbyl group containing, in addition to atoms of carbon and hydrogen, other atoms such as oxygen, sulfur, nitrogen and halogen, particularly halogen of atomic number from 9 to 53 inclusive, i.e., fluorine, chlorine, bromine or iodine, which additional atoms are present in functional groups such as alkoxy, aryloxy, carboalkoxy, alkanoyloxy, halo, trihalomethyl, cyano, nitro, dialkylamino, sulfonylalkyl, and like groups having no active hydrogen atoms.

The R group is preferably a hydrocarbyl group containing only carbon and hydrogen or hydrocarbyl groups substituted with 1 to 2 fluoro, chloro, bromo, nitro groups, alkoxy groups of 1 to 5 carbon atoms, alkylthio groups of 1 to 3 carbon atoms, or dialkylamino groups in which the alkyl groups contain individually 1 to 3 carbon atoms. A particularly preferred R group is a 2,3-dihydro-7-benzofuranyl group represented by formula (II):

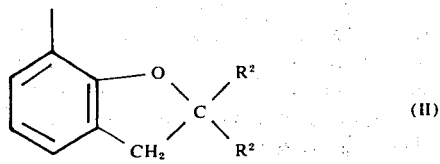

wherein the $R^2$ groups are the same or different alkyl groups of 1 to 6 carbon atoms.

Illustrative of suitable aliphatic R groups are alkyl groups of 1 to 6 carbon atoms such as methyl, ethyl, isopropyl, propyl, isobutyl and cycloalkyl groups of 5 to 6 carbon atoms such as cyclopentyl and cyclohexyl.

Aromatic R groups are exemplified by hydrocarbon aryl groups such as phenyl, naphthyl, alkylphenyl of 7 to 10 carbon atoms sch as tolyl, xylyl, 3-sec-butylphenyl, 2,3,5-trimethylphenyl, 3-sec-amylphenyl, 2,4-diisopropylphenyl, phenalkyl of 7 to 10 carbon atoms such as benzyl and 3-phenylpropyl, alkylnaphthyl such as 2-methylnaphthyl, and naphthalkyl such as 2-naphthylethyl.

Halo, nitro, alkoxy, alkylthio and dialkylamino-substituted aromatic groups are exemplified by 2-fluorophenyl, 3-fluorophenyl, 4-chlorophenyl, 2,4-difluorophenyl, 3,4-difluorophenyl, 2,4-dichlorophenyl, 3,4-dichlorophenyl, betachloronaphthyl, 2-nitrophenyl, 3-nitrophenyl, 4-nitrophenyl, 3,5-dinitrophenyl, 4-methoxyphenyl, 2-isopropoxyphenyl, 3-methylthiophenyl; 2-fluoro-4-methylphenyl, 2-chloro-3,4-dimethylphenyl, 3,5-dichloro-4-methylphenyl, 2-nitro-4-ethylphenyl, 4-nitrobenzyl, 2-fluorobenzyl, 4-methoxybenzyl, 4-methylthiobenzyl, 3,5-dimethyl-4-methylthiophenyl, 2,3-dihydro2,2-dimethyl-7-benzofuranyl, 4-dimethylaminophenyl, and 3-methyl-4-dimethylaminophenyl.

Illustrative $R^1$, $R^2$ and $R^3$ alkyl groups of 1 to 6 carbon atoms are methyl, ethyl, propyl and hexyl, Illustrative haloalkyl $R^3$ groups are chloromethyl, trichloromethyl and 1,1,2,2-tetrachloroethyl. Illustrative $R^3$ aryl groups are phenyl, alkylphenyl of 7 to 10 carbon atoms such as tolyl and 2,4-dimethylphenyl and halophenyl such as 2-fluorophenyl, 4-chlorophenyl and 2,4-dichlorophenyl.

Representative compounds include:
N-ethyldithio-N-methyl-O-methyl carbamate,
N-trichloromethyldithio-N-methyl-O-butyl carbamate,
N-1,1,2,2-tetrachloroethyldithio-N-methyl-O-cyclohexyl carbamate,
N-phenyldithio-N-methyl-O-tetrachloroethyl carbamate,
N-methyldithio-N-methyl-O-phenyl carbamate,
N-propyldithio-N-methyl-O-(alpha-naphthyl) carbamate,
N-tribromomethyldithio-N-methyl-O-benzyl carbamate,
N-p-tolyldithio-N-methyl-O-p-chlorobenzyl carbamate,
N-p-chlorophenyldithio-N-methyl-O-(3-sec-butylphenyl) carbamate,
N-ethyldithio-N-methyl-O-p-t-butylphenyl carbamate,
N-chloromethyldithio-N-ethyl-O-(beta-naphthyl) carbamate,
N-phenyldithio-N-methyl-O-fluorophenyl carbamate,
N-methyldithio-N-methyl-O-(2-chlorophenyl) carbamate,
N-o-tolyldithio-N-methyl-3,4-dichlorophenyl carbamate,
N-alkyldithio-O-p-fluorophenyl carbamate,
N-methyldithio-N-methyl-O-(2-isopropoxyphenyl) carbamate,
N-propyldithio-N-methyl-O-(2,3,5-trimethylphenyl) carbamate, N-phenyldithio-N-methyl-O-(2,4,5-trimethylphenyl) carbamate, N-methyldithio-N-methyl-O-(3-methyl-4-dimethylaminophenyl) carbamate, N-ethyldithio-N-methyl-O-(3,5-dimethyl-4-methylthiophenyl) carbamate, N-methyldithio-N-methyl-O-(2-chloro-3,4-dimethylphenyl) carbamate, and N-methyldithio-N-methyl-O-(alpha-naphthyl) carbamate.

Representative compounds of Formula (I) wherein R is a 2,3-dihydro-7-benzofuranyl group are:

O-2,3-dihydro-7-benzofuranyl-N-methyldithio carbamate,

O-2,3-dihydro-2-methyl-7-benzofuranyl-N-methyl-N-phenyldithio carbamate,

O-2,3-dihydro-2-ethyl-7-benzofuranyl-N-methyl-N-trichloromethyldithio carbamate, O-2,3-dihydro-2,2-diethyl-7-benzofuranyl-N-methyl-N-hexyldithio carbamate, O-2,3-dihydro-2,2-dimethyl-7-benzofuranyl-N-ethyl-N-tolyldithio carbamate, O-2,3-dihydro-2-phenyl-7-benzofuranyl-N-methyl-N-propyldithio carbamate, and O-2,3-dihydro-2,2-dimethyl-7-benzofuranyl-N-methyl-N-methyldithio carbamate.

It is appreciated, of course that in the compounds illustrated above, the groups prefixed by N refer to the groups substituted on the carbamate nitrogen [e.g., $R^1$ of Formula (I)] and the group prefixed by O refers to the group substituted on the carbamate oxygen [i.e., R of Formula (I)].

The dithio-substituted carbamates (I) are prepared in accordance with the following reaction (1):

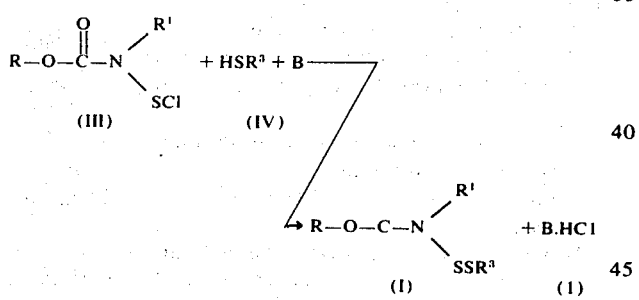

wherein R, $R^1$ and $R^3$ have the same significance as previously defined and B is an acid acceptor.

The acid acceptor is an inorganic base, e.g., alkali metal hydroxide, bicarbonate or carbonate, or an organic nitrogen base having no N—H group, such as a pyridine compound or a trialkylamine. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine and 2-butylpyridine. Suitable trialkylamines are those wherein the alkyl group contains individually 1 to 4 carbon atoms, such as trimethylamine, triethylamine, tripropylamine and tributylamine. The preferred acid acceptors are pyridine compounds, especially pyridine.

The N-chlorothio urea reactant (III) and the mercaptan (IV) are employed in substantially equimolar amounts, e.g., the molar ratio of the N-chlorothio urea reactant (III) to the mercaptan (IV) generally varies from about 1.5:1 to 1:1.5, although molar ratios of (III) to (IV) of about 1.2:1 to 1:1.2 are preferred. The molar ratios of acid acceptor to the N-chlorothio urea reactant are also substantially equimolar, e.g., the molar ratio of acid acceptor to N-chlorothio urea reactant varies from about 1.5:1 to 1:1.5, although molar ratios of acid acceptor to N-chlorothio urea reactant of about 1.2:1 to 1:1.2 are preferred.

Reaction (1) is generally accomplished by reacting the N-chlorothio urea reactant (III) and the mercaptan (IV) in the presence of the acid acceptor in the liquid phase in an inert diluent. Suitable inert diluents for the reaction include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile; dialkylamides such as dimethylformamide and dialkylsulfoxides such as dimethylsulfoxide. Preferred diluents are chlorinated hydrocarbons of 1 to 2 carbon atoms, such as methylene dichloride, chloroform, carbon tetrachloride and ethylene dichloride. Generally the amount of diluent employed ranges from 1 to 50 mols per mol of N-chlorothio urea reactant.

Reaction (1) is suitably conducted at a temperature between −20°C. and the boiling point of the diluent, although temperatures between 0° and 50°C. are preferred. The reaction is conducted at or above atmospheric pressure.

The carbamate product (I) is recovered and purified by conventional procedures such as extraction, crystallization, chromatography, etc.

The N-chlorothio carbamate reactant (III) is prepared in accordance with the following reaction (2):

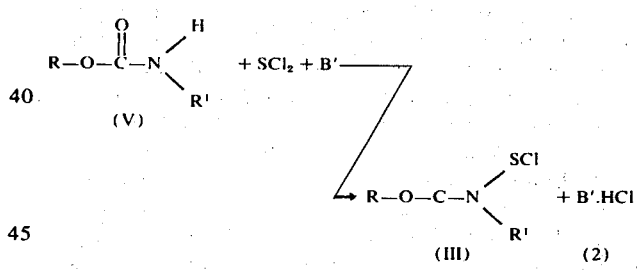

wherein R and $R^1$ have the same significance as previously defined and B' is an acid acceptor.

The acid acceptor is an organic base such as a pyridine compound or a triakylamine compound. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine.

Generally, commercially available sulfur dichloride of reasonable purity, e.g., greater tan 90–98% purity, is suitably employed. The sulfur dichloride may contain small amounts of an inhibitor such as tributylphosphate or triethylphosphate.

The sulfur dichloride and the carbamate compound are employed in substantially equimolar amounts, e.g., the molar ratio of sulfur dichloride to the carbamate compound generally varies from about 1.5:1 to 1:1.5, although molar ratios of sulfur dichloride to the carbamate compound of 1.4:1 to 1.1:1 are preferred. The molar ratio of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In order to produce the N-chlorothio carbamate compounds of the invention in high yield, it is essential to react the carbamate and sulfur dichloride in the presence of a limited amount of free, uncomplexed acid acceptor. This is suitably accomplished by the addition of the acid acceptor to a substantially equimolar mixture of the carbamate and the sulfur dichloride so that the mols of free acid acceptor to the total mols of carbamate reactant and N-chlorothio carbamate is less than 0.2:1, preferably less than 0.1:1, and more preferably less than 0.05:1. In other words, during the course of the reaction between the sulfur dichloride and the carbamate reactants, there should be at least 5 mols of the carbamate reactant and the N-chlorothio carbamate product per mol of acid acceptor which is not complexed with hydrochloric acid.

Provided that the reaction is conducted with the restricted amount of acid acceptor indicated above, the contacting of the acid acceptor with the mixture of the carbamate and the sulfur dichloride can be conducted by a variety of procedures. In one modification, the acid acceptor is added in increments, e.g., dropwise, in an inert diluent, if desired, to a mixture of the carbamate and sulfur dichloride in an inert diluent. In another modification, the acid acceptor is added continuously to a mixture of the carbamate and sulfur dichloride in an inert diluent.

Suitable inert diluents for the reaction include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile and dialkylamide such as dimethylformamide. Preferred diluents are chlorinated hydrocarbons of 1 to 2 carbon atoms, such as methylene dichloride, chloroform, carbon tetrachloride and ethylene dichloride. Generally, the amount of diluent employed ranges from 1 to 50 mols per mol of sulfur dichloride.

Reaction (2) is suitably conducted at a temperature between −20°C. and the boiling point of the diluent, although temperatures between 0° and 50°C. are preferred. The reaction is conducted at or above atmospheric pressure.

The dithio carbamates of the invention are toxic to a variety of crop and household insects. When used as insecticides, the dithio carbamates are applied in insecticidally effective amounts to insects and/or their habitats, such as vegetative hosts. The amount used will, of course, depend on several factors such as the host, the type of insect and the particular compound of the invention. As with most pesticidal compounds, the insecticides of the invention are not usually applied full strength, but are generally incorporated with conventional, biologically inert extenders or carriers normally employed for facilitating dispersion of active insecticidal compounds, recognizing that the formulation and mode of application may affect the activity of the material. Thus, the insecticides of the invention may be formulated and applied as granules, as powdery dusts, as wettable powders, as emulsifiable concentrates, as solutions, or as any of several other known types of formulations, depending on the desired mode of application.

Wettable powders are in the form of finely divided particles which disperse readily in water or other dispersant. These compositions normally contain from about 5–80% insecticide and the rest inert material, which includes dispersing agents, emulsifying agents and wetting agents. The powder may be applied to the soil as a dry dust, or preferably as a suspension in water. Typical carriers include fuller's earth, kaolin clays, silicas, and other highly absorbent, readily wettable, inorganic diluents. Typical wetting, dispersing or emulsifying agents used in agricultural formulations include, for example: the alkyl and alkyl-aryl sulfonates and their sodium salts; alkylamaide sulfonates, including fatty methyl taurides; alkylaryl polyether alcohols, sulfated higher alcohols, and polyvinyl alcohols; polyethylene oxides, sulfonated animal and vegetable oils; sulfonated petroleum oils; fatty acid esters of polyhydric alcohols and the ethylene oxide addition products of such esters; and the addition products of long-chain mercaptans and ethylene oxide. Many other types of useful surface-active agents are available in commerce. The surface-active agent, when used, normally comprises from 1 to 15% by weight of the pesticidal composition.

Dusts are freely flowing admixtures of the active ingredient with finely divided solids such as talc, natural clays, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 75% silica and 25% of the toxicant.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone, and other nonvolatile organic solvents. For application, these concentrates are dispersed in water or other liquid carrier, and are normally applied as a spray to the area to be treated.

Other useful formulations for insecticidal applications include simple solutions of the active ingredient in a dispersant in which it is completely soluble at the desired concentration, such as acetone, alkylated naphthalenes, xylene, or other organic solvents. Granular formulations, wherein the toxicant is carried on relatively coarse particles, are of particular utility for aerial distribution or for penetration of cover-crop canopy. Baits, prepared by mixing solid or liquid concentrates of the toxicant with a suitable food, such as a mixture of cornmeal and sugar, are useful formulations for control of insect pests. Pressurized sprays, typically aerosols wherein the active ingredient is dispersed in finely divided form as a result of vaporization of a low-boiling dispersant solvent carrier, such as the Freons, may also be used. All of these techniques for formulating and applying the active ingredient are well known in the art.

The percentages by weight of the active insecticide may vary according to the manner in which the composition is to be applied and the particular type of formulation, but in general comprise 0.5 to 95% of the active insecticide by weight of the insecticidal composition.

The insecticidal compositions may be formulated and applied with other active ingredients, including other insecticides, nematocides, fungicides, bactericides, plant growth regulators, fertilizers, etc.

The terms "insecticide" and "insect" as used herein refer to their broad and commonly understood usage rather than to those creatures which in the strict biological sense are classified as insects. Thus, the term insect is used not only to include small invertebrate animals belonging to the class Insecta, but also to other related classes of arthropods whose members are segmented invertebrates having more or fewer than six legs, such as spiders, mites, ticks, centipedes, worms, and the like.

EXAMPLES

Example 1 —
N-chlorothio-N-methyl-O-methyl-carbamate

O-methyl-N-methyl carbamate (17.8 g, 0.2 mol) was dissolved in 200 ml methylene dichloride. Sulfur dichloride (26.7 g, 0.26 mol) was added dropwise to the solution. Pyridine (17.4 g, 0.22 mol) was added to the solution at 25°–30°C. After the addition was complete, the pyridine hydrochloride product was filtered from the reaction mixture. Evaporation of the solvent and distillation under reduced pressure gave the N-chlorothio-N-methyl-O-methyl carbamate product. The nuclear magnetic resonance spectrum of the product showed a sharp singlet at 3.45 ppm (relative to tetramethylsilane) for the N-methyl group. The N-methyl group of the O-methyl-N-methyl carbamate starting material appeared as a doublet at 2.9 ppm (relative to tetramethylsilane).

Example 2 —
N-chlorothio-N-methyl-O-(3-sec-butylphenyl) carbamate

N-methyl-O-(3-sec-butylphenyl) carbamate (20.7 g, 0.1 mol) was dissolved in 100 ml methylene chloride. Sulfur dichloride (11.3 g, 0.11 mol) was then added to the solution at about 25°C. Pyridine (9.48 g, 0.12 mol) was added dropwise to the solution at a temperature of 25°–30°C. The resulting pyridine hydrochloride product was filtered from the reaction mixture to give a solution of N-chlorothio-N-methyl-O-(3-sec-butylphenyl) carbamate product in methylene chloride. The nuclear magnetic resonance spectrum of the solution showed a sharp singlet at 3.4 ppm (relative to tetramethylsilane) for the N-methyl group of the product.

Example 3 —
N-chlorothio-N-methyl-(alpha-naphthyl) carbamate

N-methyl-O-(alpha-naphthyl) carbamate (10.4 g, 0.05 mol) and sulfur dichloride (5.7 g, 0.055 mol) were slurried in 50 ml methylene dichloride. Pyridine (4.7 g, 0.06 mol) was then added dropwise at 25°–30°C. After the addition was complete, the pyridine hydrochloride was filtered from the reaction mixture to give a solution of the N-chlorothio-N-methyl-O-(alpha-naphthyl) carbamate product in methylene dichloride. The nuclear magnetic resonance spectrum of the product showed a sharp singlet at 3.6 ppm (relative to tetramethylsilane) for the N-methyl group of the product.

Example 4 —
N-chlorothio-N-methyl-O-2,3-dihydro-2,2-dimethyl-7-benzofuranyl) carbamate Pyridine (9.8 g, 0.12 mol) was added dropwise to a mixture of 22.1 g (0.1 mol) N-methyl-O-(2,3-dihydro-2,2-dimethyl-7-benzofuranyl) carbamate and sulfur dichloride in methylene chloride at 25°–30°C. The production of the N-chlorothio carbamate derivative was indicated by the nuclear magnetic resonance spectrum of the reaction mixture, which showed a sharp singlet at 3.7 ppm (relative to tetramethylsilane) for the N-methyl group of the N-chlorothio-N-methyl-O-(2,3-dihydro-2,2-dimethyl-7-benzofuranyl) carbamate product.

Example 5 — Preparation of
N-methyl-N-phenyldithio-O-(m-sec-butylphenyl) carbamate A solution of about 0.1 mol N-chlorothio-N-methyl-O-(3-sec-butylphenyl) carbamate in 100 ml methylene dichloride was prepared as described in Example 2.

A solution of 11 g (0.1 mol) benzenethiol and 7.9 g (0.1 mol) pyridine in 20 ml methylene dichloride was added dropwise to the solution of the N-chlorothio carbamate at °C. over a period of 5 minutes. Ten minutes after the addition was complete, the reaction was washed with water, washed with sodium bicarbonate solution, dried over magnesium sulfate and evaporated under reduced pressure to give 32.5 g of an oil residue. The oil was chromatographed over silica gel (hexane and ethyl ether-hexane eluants) to give the N-methyl-N-phenyldithio-O-(3-sec-butylphenyl) carbamate product. Elemental analysis for $C_{18}H_{21}NO_2S_2$ showed: %S, calc. 18.5, found 18.5.

An acetone solution of the N-phenyldithio carbamate product containing a small amount of nonionic emulsifier was diluted with water to 500 ppm. Cabbage leaf sections were dipped in the solution and dried. The sections were then infested with cabbage looper larvae (*Trichoplusia ni*). After 24 hours, there was a 100% mortality of the cabbage looper larvae.

Example 6 — Preparation of
N-methyl-N-methyldithio-O-(m-sec-butylphenyl) carbamate A solution of about 0.1 mol of N-chlorothio-N-methyl-O-(3-sec-butylphenyl carbamate in 100 ml of methylene dichloride was prepared as described in Example 2.

A solution of 4.8 g (0.1 mol) methyl mercaptan and 7.9 g (0.1 mol) pyridine in 20 ml methylene dichloride was added dropwise to the solution of the N-chlorothio carbamate at 0°C. over a period of 5 minutes. Ten minutes after the addition was complete, the reaction mixture was washed with water, washed with sodium bicarbonate solution, dried over magnesium sulfate and evaporated under reduced pressure to yield 27 g of an oil. The oil was chromatographed on silica gel (benzene eluant) to give the N-methyl-N-methyldithio-O-(3-sec-butylphenyl) carbamate product. The nuclear magnetic resonance spectrum of the product showed a singlet at 2.78 ppm (relative to tetramethylsilane) for the N-methyldithio group and a singlet at 3.4 ppm (relative to tetramethylsilane) for the N-methyl group. Elemental analysis for $C_{13}H_{19}NO_2S_2$ showed: %S, calc. 22.5, found 23.3.

By the procedure used in Example 5, the methyldithio carbamate product was found to give 100% control of cabbage looper larvae.

Example 7 — Preparation of
N-phenyldithio-N,O-dimethyl carbamate

A 17.4-g (0.22 mol) sample of pyridine was added dropwise to a solution of 19.8 g (0.2 mol) N-methyl-O-methyl carbamate and 26.8 g (0.26 mol) sulfur dichloride at 25°–30°C. over a period of 5 minutes. Five minutes after the addition was complete, pyridine hydrochloride was filtered and the filtrate was evaporated to give liquid residue. The residue was slurried with hexane to precipitate additional pyridine hydrochloride and evaporated under reduced pressure to give 28.1 g of the N-chlorothio carbamate product.

To a solution of the N-chlorothio carbamate in 200 ml of methylene dichloride was added dropwise 18 g (0.16 mol) benzenethiol and 12.9 g (0.16 mol) pyridine at °C. After addition was complete, the reaction mixture was washed with water, washed with sodium bicarbonate solution, dried over magnesium sulfate and evaporated to give 37.3 g (89.5% yield) of the N-phenyldithio-N-methyl-O-methyl carbamate product. A small sample was purified by column chromatography for elemental analysis, which showed: %S, calc. 27.9, found 26.6.

What is claimed is:

1. A compound of formula

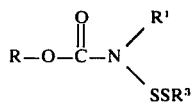

wherein P is an organo group of 1 to 20 carbon atoms and free from nonaromatic unsaturation selected from: (1) alkyl, (2) cycloalkyl, (3) phenyl, (4) naphthyl, (5) alkylphenyl, (6) alkylnaphthyl, (7) phenalkyl, (8) naphthalkyl, (9) phenyl, naphthyl, alkylphenyl, alkylnaphthyl, phenalkyl or naphthalkyl substituted with 1 to 2 fluoro, chloro, bromo, nitro, alkoxy of 1 to 5 carbon atoms, alkylthio of 1 to 3 carbon atoms or dialkylamino in which the alkyl individually contains 1 to 3 carbon atoms, and (10) 2,3-dihydro-7-benzofuranyl of the formula

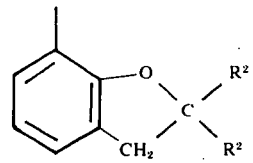

wherein $R^2$ individually is hydrogen or alkyl of 1 to 6 carbon atoms; $R^1$ is hydrogen or alkyl of 1 to 10 carbon atoms; and $R^3$ is alkyl of 1 to 10 carbon atoms, haloalkyl of 1 to 2 carbon atoms and 1 to 5 chloro or bromo, or phenyl substituted with up to 2 fluoro, chloro, bromo or alkyl of 1 to 4 carbon atoms.

2. The compound of claim 1 wherein $R^1$ is alkyl of 1 to 6 carbon atoms, R is alkyl of 1 to 6 carbon atoms, phenyl, naphthyl, alkylphenyl of 7 to 10 carbon atoms or said 2,3-dihydro-7-benzofuranyl.

3. The compound of claim 2 wherein R is alkyl.

4. The compound of claim 3 wherein R is methyl, $R^1$ is methyl and $R^3$ is phenyl.

5. the compound of claim 2 wherein R is phenyl, naphthyl or alkylphenyl of 7 to 10 carbon atoms.

6. The compound of claim 5 wherein R is m-sec-butylphenyl, $R^1$ is methyl and $R^3$ is methyl or phenyl.

7. The compound of claim 5 wherein R is naphthyl.

8. The compound of claim 2 wherein R is said 2,3-dihydro-7-benzofuranyl.

9. The compound of claim 8 wherein $R^2$ is alkyl.

10. The compound of claim 9 wherein $R^2$ is methyl.

UNITED STATES PATENT AND TRADEMARK OFFICE
CERTIFICATE OF CORRECTION

PATENT NO. : 3,914,259
DATED : October 21, 1975
INVENTOR(S) : Melancthon S. Brown, Gustave K. Kohn It is certified that error appears in the above-identified patent and that said Letters Patent are hereby corrected as shown below:

Col 1, line 11 should read --by reference--.

Col 2, line 7 should read --such--.

Col 4, line 62 should read --than--.

Col 6, line 20 should read --alkylamide--.

Title page, [75], inventors should read --Melancthon S. Brown, deceased, late of Berkely, Calif., by Gustave K. Kohn, administrator, and Gustave K. Kohn, Berkely, Calif.--

Col 9, line 38, "P" should read --R--.

Signed and Sealed this

Third Day of August 1976

[SEAL]

Attest:

RUTH C. MASON
Attesting Officer

C. MARSHALL DANN
Commissioner of Patents and Trademarks